Patented Oct. 2, 1934

1,975,072

UNITED STATES PATENT OFFICE 1,975,072

WATERPROOFING AND FIRERETARDING COMPOSITION

Charles F. Booth, Anniston, Ala., assignor to Swann Research, Incorporated, a corporation of Alabama No Drawing. Application July 1, 1931, Serial No. 548,257

7 Claims. (Cl. 134—26)

This invention relates to a new and improved type of waterproofing and fireretarding composition.

One object of this invention is the provision of a new series of products which have combined waterproofing and fireretarding properties. Another object of this invention is the production of a waterproofing product which may be applied to fibre or fibrous products such as, hemp, jute, silk, linen, wool, cotton, cellulose, or asbestos fibres either in the yarn or cord form, as well as in the woven form. The objects for which my improved waterproofing compound may be employed embrace such things as tents, awnings, cordage, canvas or leather belting, brake linings, curtains, tarpaulins, wood objects, fibre or fibre board, electrolytic cell diaphragms, whether composed of mineral, animal, or vegetable fibres or combinations of these, as well as many other materials which will readily suggest themselves to those skilled in the art.

The desired properties of a waterproofing agent in addition to its waterproofing effect as ordinarily understood are as follows:

(a) The treated object should not be rendered tacky at a useable temperature.

(b) The treated object, if of a flexible nature, should not be rendered unnecessarily brittle or inflexible at low temperatures.

(c) The object treated with the waterproofing compound should have its lasting qualities unimpaired by the treatment.

My present invention has resulted from the discovery that chlorinated diphenyl either alone or containing other related diaryls possesses excellent waterproofing and fire retarding properties. For most purposes it is desirable to modify the properties of the chlorinated diphenyls somewhat by admixture with other compounds or substances, in order to obtain or approximate the above mentioned desired properties.

By "related diaryls", above mentioned, is meant the diaryl compounds related to diphenyl and particularly represented by the diphenyl benzenes and related isomers. These compounds are formed during the thermal synthesis of diphenyl from benzene and are separated from the associated diphenyl by distillation. They are characterized by having a higher boiling point than that of diphenyl. They have also been found to have valuable properties alone or when admixed with diphenyl either before or after chlorination.

Several processes have recently been developed whereby diphenyl and its related diaryl compounds may be chlorinated, producing products ranging from light liquids, through waxes and resins, and up to and including crystalline substances.

For best results in connection with the use of these compounds in waterproofing and fireretarding applications it is preferable to use chlorinated diphenyls containing more than 60% by weight of chlorine. When diphenyl is chlorinated so that it contains more than 64% by weight of chlorine a crystalline product is obtained. This crystalline property increases as the percent of contained chlorine increases. In order to retain the non-crystalline or resinous property at a chlorine content of substantially more than 64% chlorine the related high boiling compounds previously described may be utilized to modify this property.

For some purposes it is desirable to combine two or more types of the above mentioned chlorinated diphenyl resins. In particular it has been found that mixtures of the non-crystalline diphenyl resin containing 65% chlorine with a crystalline chlorinated diphenyl resin of 68% chlorine content produce an ideal starting material to which various modifying resins, waxes and metallic soaps may be added for the manufacture of my waterproofing composition, since these products have pronounced fireretarding properties. Such resins also possess a low vaporization loss, hence, are useful at high temperatures where volatilization usually becomes serious.

In modifying the properties of the chlorinated diphenyls to make them more effective waterproofing compounds I may add thereto one or more of the following ingredients: paraffin, hydrocarbon oils, aluminum stearate or other metallic soaps, various commercial waxes such as those known as the "I. G. waxes", particularly those known as "Wax O and E", (defined more specifically hereinafter), ceresin, ozokerite, stearin pitch, various plasticizers such as dibutyl phthalate, tricresyl phosphate, chlorinated naphthalenes particularly the resinous or crystalline variety, beeswax, the natural resins such as gum damar, copal or Venice turpentine or synthetic resins of the phenol, formaldehyde, phthalic anhydride, glycerol, or vinyl acetate type. These have been found to impart various desirable properties to the chlorinated diphenyl. In order that my invention may be more readily practiced I append the following examples, as preferred methods of compounding, although it is to be understood that I do not desire to be limited thereby, except as indicated by the claims.

I. G. waxes O and E, mentioned above, are synthetic waxes manufactured substantially in accordance with U. S. Patents Nos. 1,777,766; 1,825,248, and 1,825,249. They are of a pale yellow color and have the following physico-chemical characteristics, as set forth by the manufacturers:

|  | IG-wax O | IG-wax E |
|---|---|---|
| Melting point | 102-108° | 80-83° |
| Specific gravity | 1.03-1.04 | 1.01-1.02 |
| Acid value | 20-35 | 15-30 |
| Ester value | 80-110 | 120-150 |
| Unsaponifiables | 6-15 | 8-15 |
| Iodine value | 0 | 0 |

Example I

Melt 90 parts by weight of a non-crystalline chlorinated diphenyl resin containing approximately 65% of chlorine together with 10 parts by weight of ceresin. The non-crystalline chlorinated diphenyl resin is preferably made by mixing together 60 parts by weight of technical diphenyl and 40 parts by weight of distilled high boiling compounds produced during the diphenyl synthesis from benzene and chlorinating this mixture until a chlorine content in the neighborhood of 65% is obtained. The chlorinated product is then distilled in a vacua until 85 to 95% has distilled over. The waterproofing mixture prepared in the manner just mentioned may then be sprayed in the molten state on surfaces to be protected, but it is preferably applied by making a solution of the composition in an organic solvent. Such a solvent may comprise benzene, gasoline, toluene, xylene, chloroform or carbon tetrachloride. The solution in benzene may be made by dissolving 35 grams of the above composition in 80 cubic centimeters of benzene. For treating most fibrous products whether in cordage or woven form, the material to be treated is immersed for a short time and then the benzene allowed to evaporate.

Example II

The product above described may be somewhat tacky when warm, especially if a relatively large amount, say 10–15 oz. per sq. yd. of canvas, of the composition has been applied. If this has been found to be the case the composition mentioned in Example I above may be altered so that a greater quantity of ceresin is used. The proportions of 50 parts non-crystalline chlorinated diphenyl resin of the above composition mixed with 50 parts of ceresin will give a somewhat less tacky product which may be applied in a similar manner to that given above. A particularly good composition for general waterproofing purposes, especially on canvas, may contain ceresin 90 parts together with 10 parts of the above described non-crystalline chlorinated diphenyl resin. If this is applied at the rate of from 8 to 10 oz. per square yard of canvas, say 8 oz. duck, very satisfactory results are obtained.

Example III

Melt together 30 parts of the non-crystalline chlorinated diphenyl resin mentioned in Example I above with 50 parts of chlorinated diphenyl containing 68% of chlorine, 10 parts of aluminum stearate and 10 parts of I. G. Wax E. This mixture is preferably compounded by first melting the two chlorinated diphenyl compounds together keeping the temperature of the melt below 200° C. The I. G. Wax E is then added after which the aluminum stearate is introduced in small portions at a time with stirring. The melt is then allowed to cool. Application of this waterproofing composition may be made in the usual way.

Example IV

A composition having somewhat better waterproofing properties and slightly better physical properties than that described in Example III above may be made by combining 40 parts of the non-crystalline diphenyl resin described in Example I above with 40 parts of a distilled chlorinated diphenyl having 68% contained chlorine. These substances are melted together as in Example III above, keeping the temperature below 200° C. Ten parts of I. G. Wax O is then added after which 10 parts of aluminum stearate is stirred in. The mass is allowed to cool and applied as in the previous examples.

Considerable variation may be made in the compositions indicated above using the ingredients mentioned. In addition to possessing waterproofing qualities they will be found to have valuable fireretarding properties. In place of aluminum stearate as used in Examples III and IV above, I may, of course, use other metallic soaps. These may comprise iron stearate or oleate, calcium stearate or zinc stearate.

While I have described my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A non-tacky and flexible waterproofing and fireretarding composition comprising chlorinated diphenyl, modifying waxes and a metallic soap.

2. A non-tacky and flexible waterproofing and fireretarding composition comprising a non-crystalline chlorinated diphenyl resin of more than 60% chlorine content associated with modifying waxes and a metallic soap.

3. A non-tacky and flexible waterproofing and fireretarding composition containing 40 parts by weight of a non-crystalline chlorinated diphenyl resin of 65% chlorine content, 40 parts by weight of a chlorinated diphenyl of 68% chlorine content, 10 parts by weight of a wax, and 10 parts by weight of aluminum stearate.

4. A waterproofing and fire-retarding composition comprising a mixture of chlorinated diphenyl, related chlorinated diaryls, modifying waxes and a metallic soap.

5. A woven fibrous article protectively treated with a waterproofing composition comprising a chlorinated diphenyl, a metallic soap, and a wax.

6. A woven fibrous article protectively treated with a waterproofing composition comprising a solid chlorinated diphenyl, a metallic soap, and a wax.

7. A woven fibrous article protectively treated with a waterproofing composition comprising a solid chlorinated diphenyl, aluminum stearate, and paraffin wax.

CHARLES F. BOOTH.